Patented Apr. 14, 1931

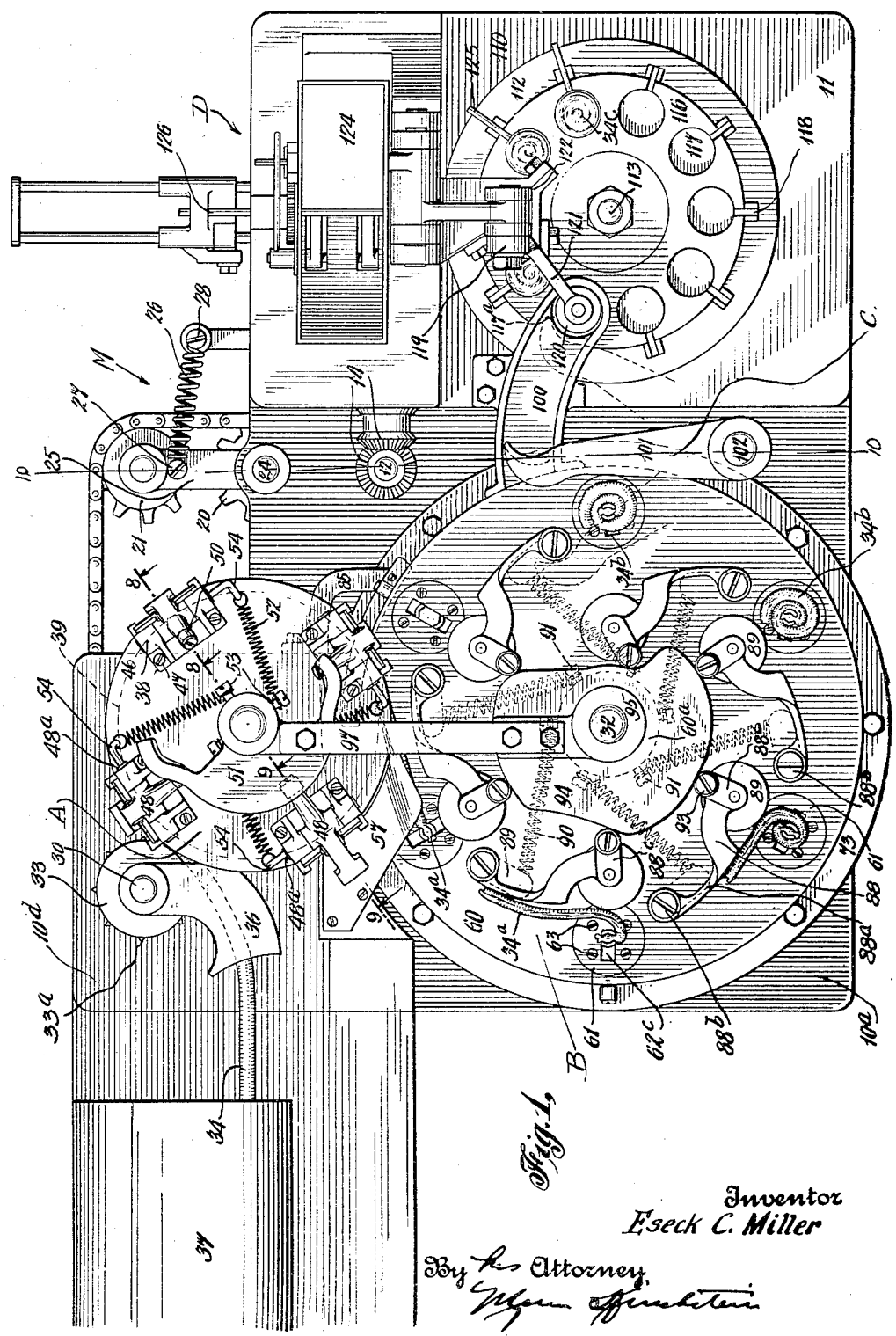

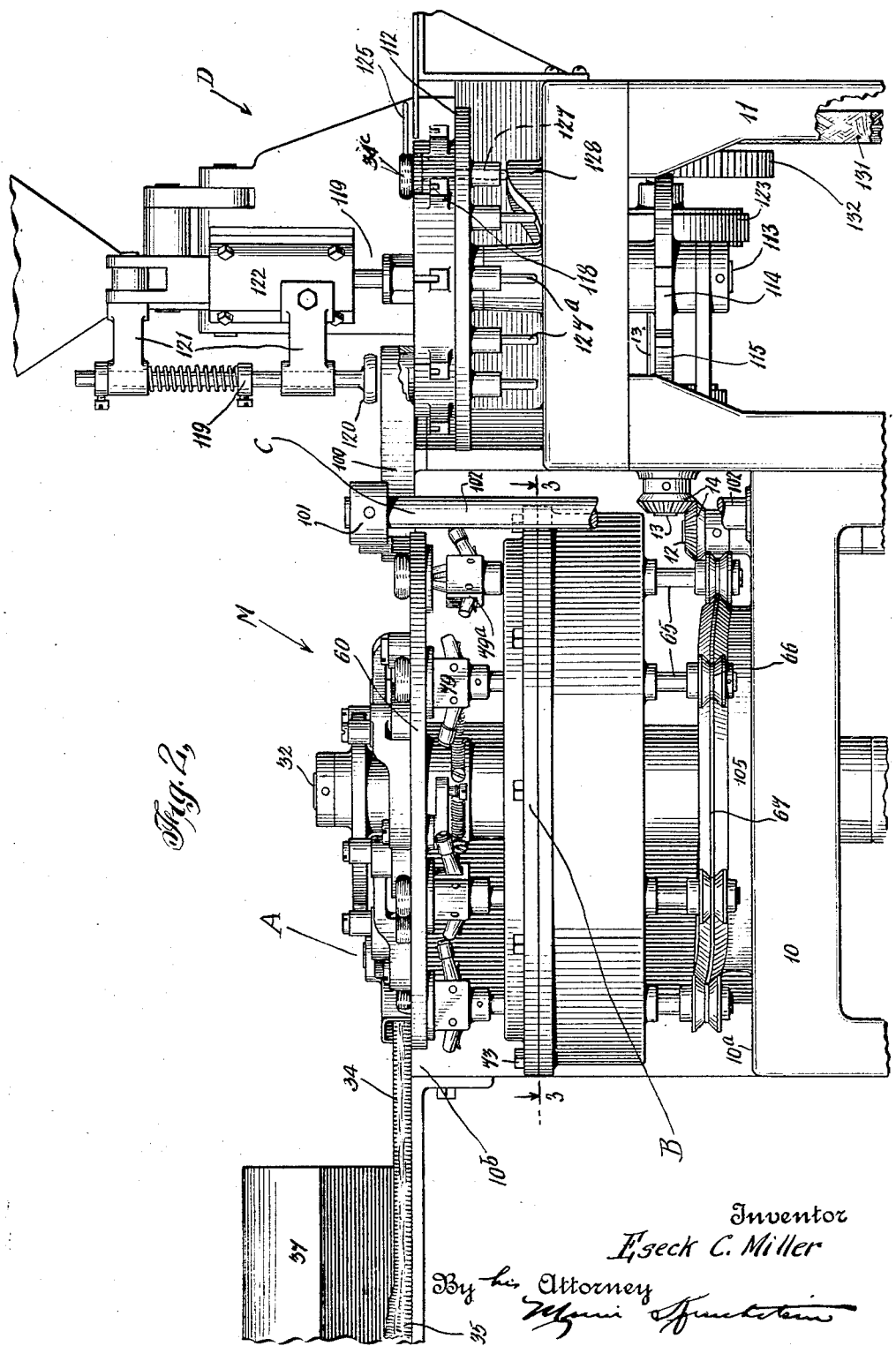

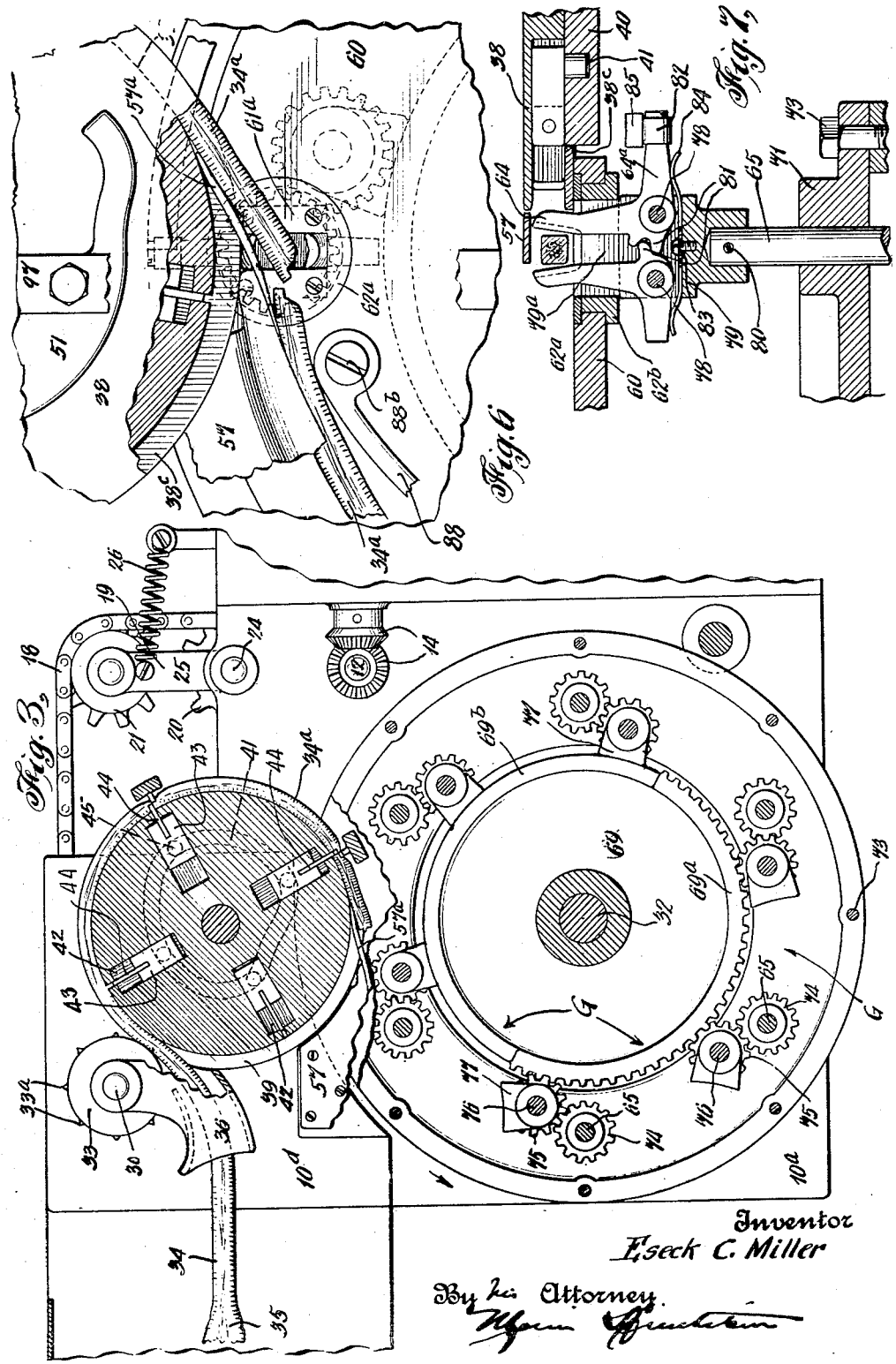

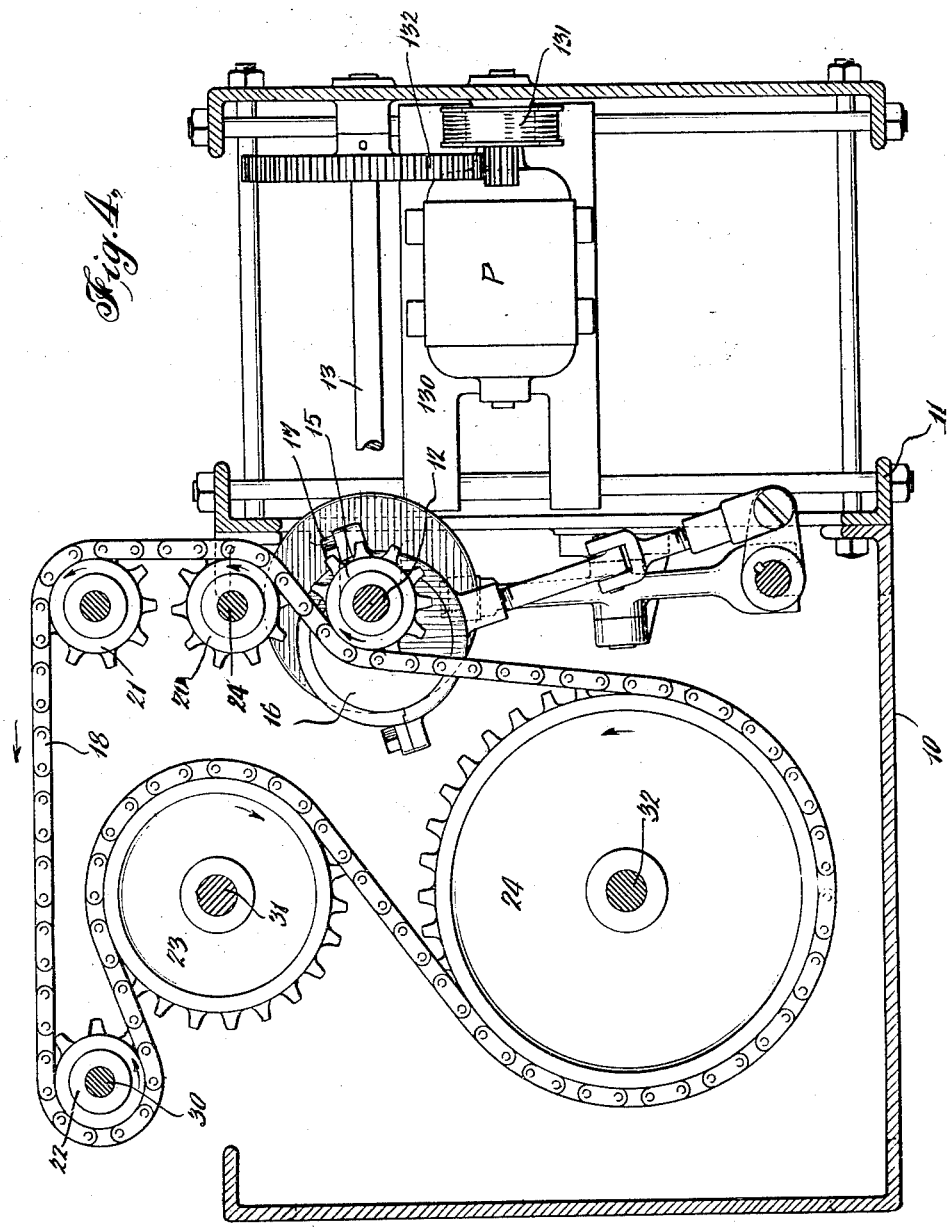

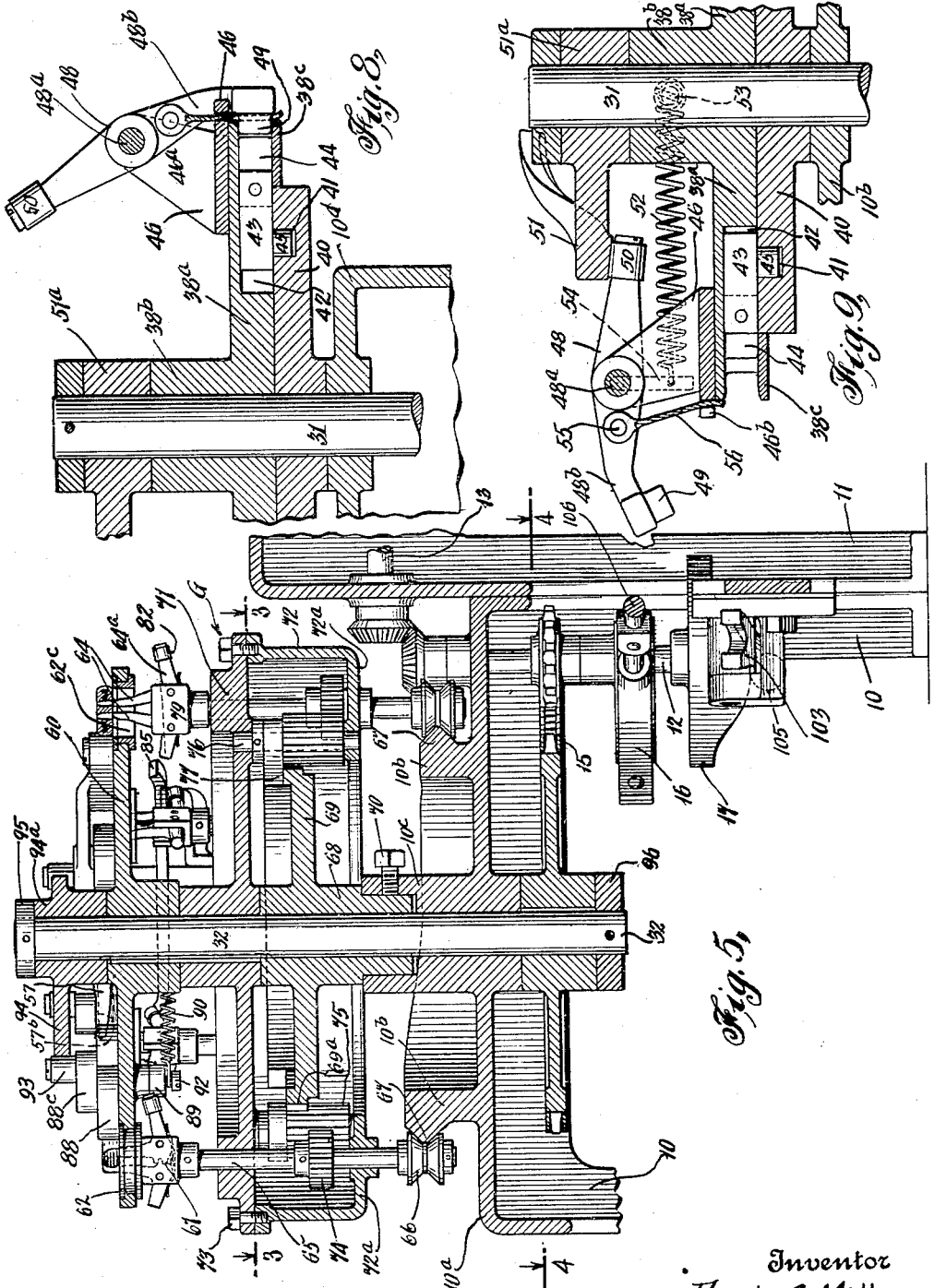

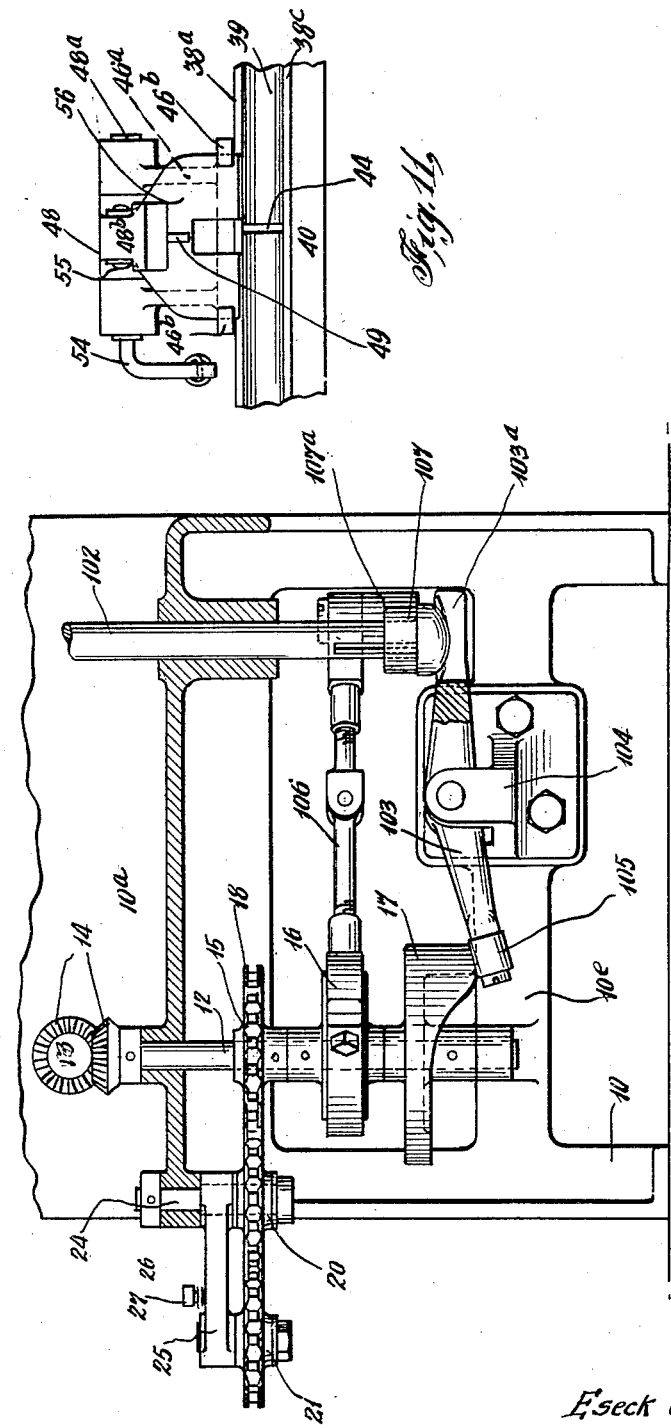

1,800,695

UNITED STATES PATENT OFFICE

ESECK C. MILLER, OF NEWARK, NEW JERSEY, ASSIGNOR OF ONE-FOURTH TO MORRIS KIRSCHSTEIN, OF NEW YORK, N. Y.

CANDY MACHINE AND PROCESS FOR MAKING CANDY

Application filed February 6, 1925. Serial No. 7,260.

This invention relates to candy machines and processes for making candies.

More particularly, the invention is directed to the provision of a machine and process for the manufacture on an efficient commercial scale of hard candy pieces having a soft filler or core such as of nut, fruit paste, peanut butter, strawberry preserves, and the like. The invention contemplates, further, the provision of a process and machine for making candy pieces or candies known as "lolly pops", the candy portions of which comprise, as distinguished from the homogeneous hard flavored lolly pop heretofore in use, a filled candy comprising an outer hard candy mass and soft candy filler, and briefly described as a "hard filled lolly pop".

Various other objects of the invention will in part be obvious and in part hereinafter pointed out.

With these objects in view, the invention accordingly consists in the process and the combinations of elements and arrangement of parts, which will be exemplified in the construction hereinafter described, and of which the scope of application will be indicated in the following claims.

In the accompanying drawings, in which is shown one of the various possible illustrative embodiments of this invention, Fig. 1 is a top plan view of a machine embodying the invention for automatically making "lolly pops";

Fig. 2 is a front elevational view of the machine shown in Fig. 1;

Fig. 3 is a fragmentary plan view of the feeding, severing and coiling mechanism for the candy strand with the upper parts removed to show the internal construction;

Fig. 4 is a sectional plan view taken on line 4—4 on Fig. 5 showing the machine drive;

Fig. 5 is a sectional view in front elevation taken on line 5—5 of Fig. 1;

Fig. 6 is an enlarged fragmentary plan view partly in section, showing the guiding and feeding of a candy strand from the severing device to the forming table;

Fig. 7 is an enlarged fragmentary view in front elevation showing the gripper in position ready to grasp the leading portion of the severed candy strand;

Fig. 8 is an enlarged fragmentary sectional view taken on line 8—8 of Fig. 1 showing a set of severing blades and guide retainers in an effective operating position;

Fig. 9 is a view similar to that shown in Fig. 8 but taken on line 9—9 in Fig. 1 to show a set of severing blades and guide retainer in an ineffective position;

Fig. 10 is a sectional view in side elevation taken on line 10—10 of Fig. 1 showing power transmission arrangement; and Fig. 11 is a fragmentary front elevational view showing the retaining plate in a raised position over the groove in the carrier.

Referring to Figs. 1 and 2 of the drawings, the machine is designated as a whole at M, and is seen to comprise a feeding and severing mechanism A, a coiling turn table B, and a discharging device C, all of which are interconnected for automatically producing in rapid succession pieces of candy of uniform size and shape from a candy mass, and which co-operate to supply said pieces to the "lolly pop" molding machine D.

Machine M may have a base frame 10 of any suitable size, construction and design for supporting thereon the mechanism A, turn table B, and device C, at the proper height to bring them into co-acting relation with each other, and with the molding machine D, the latter being supported on an adjacent separate suitable base 11.

Power to run machine M may be transmitted to a vertical drive shaft 12, from a main horizontal drive shaft 13 of the molding machine D through a pair of bevelled gears 14. The upper end of said shaft 12 is journaled in a low horizontal top portion 10$^a$ of frame 10, and the lower end of said shaft is journaled in a bearing supported on a cross brace 10$^e$ as shown in Fig. 10. Secured on the downwardly extending portion of said shaft 12 beneath portion 10$^a$ are a main driving sprocket wheel 15, an eccentric 16, and a disc cam 17 as shown in Figs. 5, 6 and 10. The purpose of these will hereinafter be described.

The sprocket 15 drives an endless sprocket chain 18 which runs substantially in a horizontal plane beneath the frame portion 10ᵃ and successively engages with a chain take-up guide 19 which includes two idle sprocket wheels 20 and 21, sprocket wheels 22 and 23 for driving the feeding and severing mechanism A, and a large main drive sprocket wheel 24 for driving the turn table B.

The chain take-up guide 19 as seen from Figs. 1, 4 and 10, has the wheel 20 revolubly mounted on a fixed stub shaft 24 extending downwardly beneath frame portion 10ᵃ, and has the wheel 21 revolubly mounted on an outwardly extending end of an arm 25, the other end of said arm being pivotally mounted on said stub shaft 24 over wheel 20. A tension spring 26 is provided to urge wheel 21 into position for guiding and taking up the chain slack, said spring 26 having one end thereof fastened at 27 on an outer portion of arm 25, the other end of the spring 26 being anchored as at 28 to a relatively fixed support extending outwardly from molding machine D. The chain 18 is passed around the wheels 22, 23 and 24 to rotate vertical driving shafts 30, 31, and 32 respectively in the direction indicated by the arrows as shown in Fig. 4.

The power for operating the feeding and severing mechanism A as noted above is transmitted through sprocket wheels 22 and 23 and shafts 31 and 32 respectively, the wheel 23 being secured to the lower end of a vertical shaft 31 which extends up through a raised horizontal portion 10ᵈ of frame 10.

Secured to the upper end of shaft 30 above said portion 10ᵈ is a horizontally disposed feeder-roll 33 which is positioned to receive a continuous elongated strand 34 of candy formed from a mass supply 35 through a receiving guideway 36 mounted on portion 10ᵈ as shown in Figs. 1, 3 and 11.

The feeding and severing operation and mechanism will now be described.

By means of a heating device 37, the candy mass 35 is kept in plastic condition in the well known manner, a fragmentary portion of said mass 35 and heater 37 being shown in Figs. 1 and 3. The candy mass 35 is manipulated and stretched by the operator to form the elongated strand 34, which is passed through the guideway 36 where it is grasped by a series of spaced peripheral teeth 33ᵃ on the roll 33, and urged into a channel groove 39 formed in the perimeter of a rotary carrier 38 of mechanism A as shown in Fig. 3.

The carrier 38 (see Fig. 8) comprises a circular body portion 38ᵃ in which said groove 39 is formed and an upwardly projecting central hub 38ᵇ through which extends the upper portion of the vertical shaft 31, said carrier 38 being secured to the shaft 31 in any suitable manner for rotation therewith.

Ring 38ᶜ is secured to the under side of body portion 38ᵃ and forms a side wall for the groove 39. The body portion 38ᵃ is mounted to ride on a fixed circular cam plate 40 which has a cam groove 41 formed on the upper side thereof. Four uniformly spaced radial recesses 42 are provided on the under side of said body portion 38ᵃ, each of which have slidably mounted therein a traveling blade holder 43 carrying a blade 44 as shown in Figs. 3, 8 and 9. Secured to said holders 42 and downwardly extending therefrom, are pins 45 which ride in the cam groove 41 of plate 40 for reciprocating the holder 43 and blade 44 in the recesses 42 when the carrier 38 is rotated.

On the upper side of carrier portions 38ᵃ and directly over each recess 42 is secured a bracket 46 by suitable means such as screws 47. Each bracket 46 has an upstanding bifurcated portion 46ᵃ comprising forked members between which an arm 48 is pivotally supported, the latter having a shaft 48ᵃ extending through its midsection and journaled in the said bifurcated portion 46ᵃ as shown in Figs. 1, 8 and 9.

The outer end of arm 48 has secured thereto a severing blade 49 which is arranged to swing into position for shearing co-operation with the blade 44 mounted in carrier portion 38ᵃ as will hereinafter be described in detail. The inner end of arm 48 carries a cam roller 50 which is adapted to ride on the under side of a fixed cam plate 51, the latter being provided with a hub portion 51ᵃ through which the vertical shaft 31 extends. (See Figs. 1 and 8.) Each arm 48 is normally urged to swing its outer end with the blade 49 to effective severing position shown in Fig. 8 by a tension spring 52. One end of said spring 52 is anchored on a stud screw 53 threaded into the hub portion 38ᵃ of carrier 38, and the other end of which is secured to a rock arm 54, rigidly fastened to one end of shaft 48ᵃ of arm 48 as shown in Figs. 1 and 9.

From the above description it is seen that carrier 38 as it rotates clockwise receives the candy strand 34 in groove 39 and each arm 48 as it passes the feeder roll 33 is released from the action of the cam plate 51 and thereafter swings the end thereof carrying blade 49 downwardly to the effective severing positions. Referring now to Fig. 3, it is seen that in the meantime, through the cam action of pin 45 in cam groove 41, each corresponding holder 33 with blade 44 is reciprocated in its recess 42 from a retracted position to extend the blade 44 into groove 39 for co-operating with the blade 49 to shear the strand 34. The blades 44 and 49 are preferably arranged to be brought together very gradually so that portions of the candy adjacent the section to be severed are constructed by a pinching closure action of the blades prior to shearing. The said pinching closure action is highly desirable for sealing the severed ends of the candy strands when the latter have a core or filling of nut or fruit preserves. The knife edges of blades 44 and 49 pass each other to complete the shearing when they are substantially in the position shown in Fig. 1 at line 8—8. (See also Fig. 3.) The arm 48, as it approaches the turn table B on the rotation of the carrier 38 is arranged to have the roller 50 engage with cam plate 51 to raise the blade 49 from the front of groove 39 to permit the passage of the uniformly severed strands 34$^a$ to the turn table B.

The candy strand may be kept from being accidentally displaced from the groove 39 by providing a retaining plate 56 which is pivoted at 55 on the outer shank portion 48$^b$ of each arm 48, said plate 56 being reciprocated across the outer edges of groove 39 during the movement of said arm up and down. The plate 56 is restricted in its movement by inturned portions 46$^b$ outwardly projecting from the base of brackets 46, which act as edge guides for said plate 56. In Figs. 9 and 11, the plate 56 is shown in its ineffective raised position permitting free access to or from groove 39 in carrier 38. The plate 56 in its lowermost position, as shown in Fig. 8, and in all other intermediate positions, is effective to prevent any strand of candy from leaving the groove 39 due to any cause such as the tendency for the candy to stick to the blade 49 from being accidentally displaced from the grooves 39 on the upwardly swinging movement of said blade.

The severed candy strands 34$^a$ are automatically transferred from carrier 38 to turn table B by means of a deflecting guide plate 57 secured to frame portion 10$^d$ as shown in Figs. 1 and 6. Further explanation of the transferring operation will be included in the description of the turn table B and the gripping and coiling operation which follows:—

Turn table B has a horizontally disposed circular top 60 secured to revolve with the drive shaft 32, said top 60 being positioned a little below the level of carrier 38 and extending beneath the latter adjacent the deflecting plate 57, as shown in Fig. 1, so that the severed candy strands 34$^a$ may be easily transferred from the carrier 38 to the top 60.

The deflecting plate 57 directs each candy strand 34$^a$ into the normal path of movement of the upper effective portions of a plurality of uniformly spaced gripping and coiling devices 61 supported on the outer portion of top 60 as shown in Figs. 1 and 6. Each device 61 has a circular bearing member 62 at the upper end thereof comprising a disc 62$^a$ which sets flush with the upper surface of top 60, and a flanged body 62$^b$ which extends up through an opening in the under side of the top 60, said body 62$^b$ being secured to the disc 62$^a$ by any suitable means as by screws 63. As will be seen from Fig. 5, member 62 forms with top 60 an undisplaceable revoluble bearing for the upper end of device 61. Each member 62 is provided with a vertical guiding slot 62$^c$ therein to permit a pair of upstanding gripping fingers 64 to slidingly pass therethrough from beneath.

The devices 61, during the normal operation of the machine, are automatically given two separate and distinct movements, first a vertical movement for controlling the gripping and releasing of the candy strand 34$^a$ by the fingers 64, and second, an intermittent rotary movement for coiling the strands 34$^a$. From Fig. 5 it will be seen that the first of the above mentioned movements is provided for by mounting the fingers 64 at the upper end of a vertically extending shaft 65 which has a V-grooved cam roller 66 secured at the lower end thereof. Roller 66 rides on a cam track 67 of V-section to correspond with the groove in roller 66, said track 67 being preferably formed on the outer side of and integral with a cylindrical annular portion 10$^b$ upstanding from frame portion 10$^a$. Track 67 is disposed about portion 10$^b$ in a continuous circular loop and is arranged to raise and lower the shaft 65 the required amount and in the proper sequence to effect the gripping and releasing action of fingers 64, as will hereinafter appear.

The intermittent rotary movement for coiling the strands 34$^a$ is provided for by incorporating a Geneva type of gearing G for rotating devices 61. In Fig. 5 is shown a central hub 10$^c$ which preferably is made integral with and upstands from the frame portion 10$^a$. Into the upper end of said hub 10$^c$ is fitted a downwardly extending hub portion 68 of horizontally disposed circular member 69 comprising a sector rack 69$^a$, and sector, sliding-rider guide 69$^b$ of the Geneva gearing G. The drive shaft 32 is permitted to pass freely through the hub 10$^c$ and the hub portion 68 of member 69 which may be adjustably secured in horizontal positions by a tap bolt 70 threaded through the upper end of said hub 10$^c$ to engage with the hub portion 68 as shown in Fig. 5.

Mounted over member 69 is a circular bearing plate 71 which is secured to the drive shaft 32 for rotation in unison with the table top 60 mounted thereabove. Said plate 71 has a depending annular member 72 secured thereto by bolts 73. The member 72 is provided with an inturned flange 72$^a$ at its lower end to serve with plate 71 as supporting and guiding means for the lower portions of devices 61 and the rotary portion of the Geneva gearing G as shown in Fig. 5.

To interconnect the gearing G with the devices 61, a gear 74 is fastened in position on each of the shafts 65 to mesh with a pinion gear 75 mounted to turn with a short vertical shaft 76 journaled between the plate 71, and flange 72$^a$. The gear 75 is adapted to be driven by the sector rack 69ª during approximately half a revolution of turn table B for rotating the devices 61, and is provided with a relatively wide face to permit the vertical movement of the gear 74, therealong without disengagement therewith, as shown in Figs. 3 and 5.

Rigidly mounted on shafts 76 above each gear 75 is a sliding rider 77 which is adapted to co-operate with the sector guide 69ᵇ during the remaining half revolution of the turn table B for preventing the devices 61 from rotating. The sector rack 69ª is positioned slightly below the level of the under side of rider 77 to permit the free passage thereof over the sector rack 69ª, and all the co-acting parts are so proportioned and assembled that the rider 77 will be in position to be engaged by the sector guide 69ᵇ when it leaves the sector rack 69ª and will leave the sector guide 69ᵇ to be effective to rotate the devices 61 at the predetermined desired position with respect to the transfer guide plate 57. The timing of the movements of the devices 61 may be varied so as to co-operate with the other mechanisms by loosening the bolt 70, adjusting member 69 on portion 10ᶜ and then retightening the bolt.

From Figs. 5 and 7 it is seen that each pair of gripping fingers 64 is pivotally mounted to rock on pins 78 journaled between the upstanding portion 79ª of a bifurcated block 79, the lower end of said block 79 being fitted on and secured to the upper end of shaft 65 by means of pin 80. The fingers 64 are provided with outwardly extending rock-arms 64ª and with interlocking teeth 81 adjacent their pivotal mountings to cause said fingers to act together for gripping or releasing when either finger is rocked on its pivot. One of the rock arms 64ª has mounted on its free end a cam roller 82. Secured to the bottom of the slot of the bifurcated block 79 by a screw 83 is a flat spring 84 which bears on the under side of the rock arms 64ª and normally urges the fingers 64 into gripping position. To control the action of the fingers 64, a sector cam plate 85 is provided fixedly secured to an upstanding portion of frame 10 the under side of said plate 85 being adapted to engage with the roller 82 for depressing the rock arm 64ª to separate the fingers 64.

It will be noted that the movements of fingers 64, that is the vertical movement, thereof through the shaft 65 and the cam track 67, and the pivoting movement thereof for separating of the fingers by the cam action of plate 85 described above are all independently controlled. The relation of these movements to each other and to the other mechanism is important to the successful forming of the strand 34ª into a desirable compact shape as will hereinafter appear.

Referring now to Figs. 1 and 5, there is shown pivoted on table top 60 a set of guiding and coil forming members 88, one for each device 61. Said member 88 has a guide shank portion 88ª which extends in the direction of rotation of the top 60 and toward the device 61 with which it co-operates, and a horizontally disposed coil forming roller 89 mounted on the free end thereof which is shaped to position roller 89 inwardly of said device 61. Member 88 has a pivotal portion 88ᵇ which passes down through top 60, and a rock arm 89 secured to the lower end of portion 88ᵇ beneath the top 60. To constantly urge the free end of member 88 with roller 89 in an inwardly direction, a tension spring 90 is provided one end of which is anchored to a screw 91 threaded with the downward extension of the central hub portion 60ª of top 60, the other end of the spring being secured to the free end of rock arm 89 by any suitable means such as screw 92. To control the outwardly swinging movement of member 88, the latter has an inwardly extending projecting portion 88ᶜ which carries at the upstanding free end thereof a cam roller 93. Said roller 93 is adapted to travel on a cam plate 94 which is fixedly mounted over the top 60, and which has a hub portion 94ª through which the drive shaft 32 freely passes. The shaft 32 may be provided at the top and bottom ends thereof with the usual end collars 95 and 96, cam plates 61 and 94 being rigidly bolted to the ends of a cross-brace 97 for preventing said plates from turning.

The transferring of the candy strands from carrier 38 to turn table B and the coiling operation take place as follows:—

The leading end of candy strand 34ª is guided out of the groove 39 of carrier 38 by a portion 57ª of deflecting guide plate 57, which projects into the said groove 39 as shown in Fig. 6. As the candy strand 34ª reaches the top 60, it is directed into the path of one of the devices 61 which are controlled so as not to be rotated by the Geneva gearing G, and in which devices the fingers 64 are held in released separated position, depressed below the level of the upper surface of top 60 by the action of the cam plate 85 and cam track 67 respectively. The leading end of candy strand 34ª is caused to rest on disc 62ª of device 61 and as the top 60 revolves the strand 34ª is carried along and held against outward displace by the outer guiding side of plate 57. Just before devices 61 pass from under plate 57 as shown in Fig. 5, the fingers 64, one on each side of the candy strand 34ª are raised above the level of the top 60 by the action of cam track 67, the under guiding side of plate 57 being cut away as at 57ᵇ to permit raising the outer finger. As the device 61 passes beyond plate 57, the fingers 64 are released from the action of the cam plate 85 to grip the leading end of the candy strand 34ᵃ. To prevent the accidental upward displacement of the latter when the fingers 64 are being raised, the guiding side of plate 57 is shaped to overlie the candy strand 34ᵃ as shown in Figs. 1 and 7.

In Fig. 1 are shown the candy strands 34ᵃ in the various progressive stages of coiling to form a uniform and compact piece 34ᵇ. The shank portions 88ᵇ of members 88 serve to guide the free end portions of the candy strands 34 outwardly, while the rollers 89 controlled through the cam plate 94 co-operate with the rotary action of devices 61 to coil the candy strands 34ᵃ. To obtain the most satisfactory coiling results, the roller 89 should preferably become effective only after the devices 61 have been rotated by the Geneva gearing G approximately one revolution, so that the candy strands 34ᵃ thereon may be permitted to gradually conform to the sharp bending required to begin the coiling.

The coiling operation is finished when the devices 61 pass by the sector rack 69ᵃ of the Geneva gearing G and cease to rotate. Thereafter the candy pieces 34ᵇ are carried by the top 60 and are held thereon by the fingers 64 embedded in said pieces 34ᵇ. The fingers 64 are shaped to permit easy withdrawal or lowering thereof, so that the pieces 34ᵇ are released before reaching the entrance side of a slideway 100 supported from the molding machine D. The discharging device C then acts to sweep the candy pieces off the top 60 along said slideway 100 in proper sequence into the molding machine D as is seen from Fig. 1.

The discharging device C has a sweep arm 101 mounted on the upper end of a vertical shaft 102, the lower end of which extends downwardly through frame portion 10ᵃ and has a driving connection attached thereto as shown in Fig. 10. The arm 101 in operation is given a paddling motion, that is, the free end of the arm in moving the candy pieces 34ᵇ along the slideway 100 is swung forwardly or outwardly with respect to machine B at substantially the level of said slideway 100. At the end of the stroke it is raised to a higher level so as to take hold on the return stroke of a candy piece 34ᵇ then in position on top 60. The cycle of movement is repeated and timed to correspond with the speed of operation of machines B and D.

The raising and lowering movement of the arm 101 is effected through the lever 103 which pivots on a bracket member 104, the latter being rigidly bolted to the cross brace 10ᵉ of frame 10. One end of the lever 102 has a cam roller 105 mounted thereon which co-operates with the cam 17 on drive shaft 12 for swinging the opposite forked-end 103ᵃ vertically to raise and lower the shaft 102 with the arm 101.

To provide for the swing of the arm 101 back and forth, an adjustable linkage 106 is connected between the eccentric 16 on drive shaft 12 and an offset rocker portion 107ᵃ of a rock-collar member 107, said member being splined to the lower portion of shaft 102 to permit free vertical movement therethrough as shown in Fig. 10.

The candy pieces 34ᶜ as they are discharged from device C may be assembled for packing as finished products, or they may be subjected to further operations, as for example the molding and mounting thereof on the end of a stick to form a "lolly pop". Such molding and stick inserting machine is shown in Figs. 1 and 2.

The molding machine D comprises a base frame 11 and a table top 110, in a reduced portion of which, the molding mechanism is arranged. Said mechanism comprises turn table 112 mounted for rotation at the upper end of a vertical shaft 113, the rotary movement of which is controlled by a horizontally disposed ratchet wheel 114 secured to the lower end of the shaft 113 and a pawl 115, the latter two elements being positioned beneath the top 112.

Suitably secured upon turn table 110 is a die 116 having formed therein a circular series of pits 117, which are concentric with the shaft 113 and adapted to consecutively receive the candy pieces 34ᶜ as they are discharged by device C from mechanism B. Each pit 117 has a radial channel 118 extending outwardly therefrom. The purpose of said channel 118 will hereinafter be explained.

A plunger mechanism 119 having plunger dies 120 shaped to conform with the pits 117 is resiliently mounted on vertically spaced bracket arms 121, the latter being carried by plunger head 122. Said die 120 is adapted to resiliently compress and shape a candy piece 34ᶜ in a receiving pit 117 which is arranged to be held in alignment with said die 120 during a downward movement of the plunger head 122 driven through the eccentric strap 123.

A hopper 124 is conveniently arranged for holding a supply of sticks 125 and means is provided for feeding one stick at a time to the horizontal plunger 126 which is adapted to drive a stick 125 along the channel 118 so that the point comes within the central portion of the pit and the stick 125 forced into the compressed candy piece 34ᵈ. Each channel 118 is arranged to be consecutively moved into co-operative alignment with the plunger 126 and held there to permit the insertion of a stick into the candy piece in the pit.

Located in the bottom of each pit 117 is a companion die 127 having a downwardly extending stem 127ᵃ, the ends thereof co-operating with an upstanding cam surface 128 on top 110. As will be understood from Fig. 2, the riding upon and over cam surface 128 of the respective stems 127a causes the ejection of the finished units 34c from the pits by the lifting action of the cam 128 on the stems 127a. The completed lolly pops may be disposed of in any suitable manner for wrapping or packing.

To make the entire apparatus self contained, a platform 130 may be provided under base frame 11 for supporting a motor P which transmits power to the main drive shaft 13 through a belt and pulley 131, and a suitable reducing speed gearing 132 of well known construction as shown in Figs. 2 and 4.

It will thus be seen that there is provided a device in which the several objects of this invention are achieved and which is well adapted to meet the conditions of practical use.

As various possible embodiments might be made of the above invention, and as various changes might be made in the embodiments above set forth, it is to be understood that all matter herein set forth, or shown in the accompanying drawing is to be interpreted as illustrative and not in a limiting sense.

Having thus described my invention, I claim as new and desire to secure by Letters Patent:—

1. In a candy machine of the character described adapted to operate on an elongated candy strand fed thereto, in combination a coiling apparatus comprising a turn table, a device revolubly mounted on said table adapted to engage a leading end of said candy strand, and guiding and forming means mounted on said turn table to co-operate with the device for coiling said candy strand into a compact round shape.

2. In a candy machine of the character described adapted to operate on an elongated candy strand fed thereto, in combination a coiling apparatus comprising a horizontally disposed turn table, a device revolubly mounted on said table, said device having gripping means extending above said table, and adapted to engage a leading end of said candy strand, and guiding and forming means pivotally mounted on said table adjacent the device for co-operating therewith to coil the candy strand into compact round shape.

3. In a candy machine of the character described adapted to operate on an elongated candy strand fed thereto, in combination a coiling apparatus comprising a horizontally disposed turn table, a device revolubly mounted on said table, said device having gripping means extending above said table, and adapted to engage a leading end of said candy strand, and guiding and forming means pivotally mounted on said table adjacent the device for co-operating therewith to coil the candy strand into compact round shaped, and means for withdrawing said gripping means from its engaging position with the coiled candy.

4. In a candy machine, a coiling apparatus comprising a horizontally disposed turn table, a plurality of devices uniformly spaced on the outer portion of the table and mounted thereon for intermittent rotation, each device having a pair of fingers supported to movably extend above said table and adapted to engage a leading end of a normally elongated candy strand fed to the device, a guiding and forming means pivotally mounted on the table adjacent each device for co-operating therewith, and means for controlling and operating the above mentioned parts to coil a succession of candy strands into compact round shape.

5. In a candy machine, a coiling apparatus comprising a horizontally disposed turn table, a plurality of devices uniformly spaced on the outer portion of the table and mounted thereon for intermittent rotation, each device having a pair of fingers supported to movably extend above said table and adapted to engage a leading end of a normally elongated candy strand fed to the device, a guiding and forming means pivotally mounted on the table adjacent each device for co-operating therewith, and means for controlling and operating the above mentioned parts to coil a succession of candy strands into compact round shape, said means including mechanism for withdrawing the fingers from engagement with the coiled candy and for operating the gripping movement of said fingers.

6. In a candy machine adapted to operate on a succession of elongated candy strands, a mechanism comprising revoluble means for coiling each of said strands into compact round shape, said means including a Geneva gearing having a sector gear rack and pinion, and a sector sliding guide and rider for intermittently rotating parts of said means.

7. In a candy machine adapted to operate on a succession of elongated candy strands, a mechanism comprising a turn table, devices uniformly mounted on said table, and a Geneva gearing for intermittently revolving said devices to coil each of said strands into compact round shape.

8. In a candy machine adapted to operate on a succession of elongated candy strands, a mechanism comprising a turn table, devices uniformly mounted on said table, a Geneva gearing for intermittently revolving said devices to coil each of said strands into compact round shape, and relatively fixed means for controlling the coiling operation.

9. In a candy machine adapted to operate on a succession of elongated candy strands, a mechanism comprising a horizontally disposed turn table, devices revolubly mounted on said table, guiding and forming means co-operating with said devices for coiling each of said strands into compact round shape, and relatively fixed means positioned above and beneath said table for controlling the coiling operation.

10. A combination in a candy machine for operating on a continuous elongated candy strand, comprising means for feeding the strand to the machine, a rotary carrier and severing means for dividing the strand into pieces of uniform length, means for coiling each of said candy pieces into compact round shape, means for guiding and directing said pieces from the carrier to the coiling means, and means for actuating the above mentioned means in timed relation.

11. A combination in a candy machine for operating on a continuous elongated candy strand, comprising a feed roller, a rotary carrier co-operating therewith and having a groove in the perimeter thereof to receive said strand, severing means mounted on said carrier for dividing the strand into pieces of uniform length while being carried in said groove, and deflecting means for guiding the cut candy strands out of said groove, a turn table, devices mounted on said table for engaging the leading end of the candy strands as they are guided from said plates, and guiding and forming means mounted on said turn table to co-operate with the devices for coiling each of said candy strands into a compact round shape.

12. A combination in a candy machine for operating on a continuous elongated candy strand, comprising a feed roller, a rotary carrier co-operating therewith and having a groove in the perimeter thereof to receive said strand, severing means mounted on said carrier for dividing the strand into pieces of uniform length while being carried in said groove, and deflecting means for guiding the cut candy strands out of said groove, a turn table, devices mounted on said table for engaging the leading end of the candy strands as they are guided from said plates, guiding and forming means mounted on said turn table to co-operate with the devices for coiling each of said candy strands into a compact round shape, and a movable arm for successively discharging the coiled candy pieces.

13. A combination in a candy machine for operating on a continuous elongated candy strand, comprising a feed roller, a rotary carrier co-operating therewith and having a groove in the perimeter thereof to receive said strand, and severing means mounted on said carrier for dividing the strand into pieces of uniform length while being carried in said groove, and deflecting means for guiding the cut candy strands out of said groove, a turn table, devices mounted on said table for engaging the leading end of the candy strands as they are guided from said plates, and guiding and forming means mounted on said turn table to co-operate with the devices for coiling each of said candy strands into a compact round shape, and means including a stick inserting mechanism actuated in proper time relation with the coiling operation for molding the successive coiled candy pieces and thereafter mounting each piece on a stick.

14. A combination in a candy machine for operating on a continuous elongated candy strand, comprising a feed roller, a rotary carrier co-operating therewith and having a groove in the perimeter thereof to receive said strand, severing means mounted on said carrier for dividing the strand into pieces of uniform length while being carried in said groove, deflecting means for guiding the cut candy strands out of said groove, a turn table, devices mounted on said table for engaging the leading end of the candy strands as they are guided from said plates, guiding and forming means mounted on said turn table to co-operate with the devices for coiling each of said candy strands into a compact round shape, means including a stick inserting mechanism actuated in proper time relation with the coiling operation for molding the successive coiled candy pieces and thereafter mounting each piece on a stick, and a movable arm for feeding the coiled candy pieces successively from the table to the said means.

15. In a machine of the character described, the combination of means for compactly winding pieces of candy from an entire severed length of an elongated continuous candy strand, means arranged in co-operative relation with respect to the aforesaid means for molding said candy pieces and mounting thereof on sticks, and an interconnected driving means arranged to actuate and control the parts of the both aforesaid means in timed relation for making the entire operation continuous.

16. A candy manufacturing process consisting in forming a candy mass having a filler into a continuous elongated strand with a "soft" core, dividing the strand into portions of uniform length, sealing the ends thereof and coiling said portions into compactly shaped pieces.

17. A candy manufacturing process consisting in forming a candy mass having a filler into a continuous elongated strand with a "soft" core, dividing the strand into portions of uniform length, sealing the ends thereof, and coiling said portions into compactly shaped pieces, and molding said pieces into desired finished shape.

18. A candy manufacturing process consisting in preparing a candy mass with a filler and shaping same into a continuous elongated strand, bringing pressure on spaced relatively small portions of the strand for sealing the filler between said pressed portions, severing the strand at said portions and coiling said severed strands into compactly shaped pieces.

19. A candy manufacturing process consisting in preparing a candy mass with a filler and shaping same into a continuous elongated strand, bring pressure on spaced relatively small portions of the strand for sealing the filler between said pressed portions, severing the strand at said portions and coiling said severed strands into compactly shaped pieces, and molding said pieces into a desired finished shape.

In testimony whereof I affix my signature.

ESECK C. MILLER.